(12) United States Patent
Zhang et al.

(10) Patent No.: US 11,538,145 B2
(45) Date of Patent: Dec. 27, 2022

(54) GAS MONITORING IMAGE RECORDING DEVICE, METHOD, AND PROGRAM

(71) Applicant: Konica Minolta, Inc., Tokyo (JP)

(72) Inventors: Xiaochen Zhang, Suita (JP); Shoji Kotani, Otsu (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/973,171

(22) PCT Filed: Mar. 15, 2019

(86) PCT No.: PCT/JP2019/010999
§ 371 (c)(1),
(2) Date: Dec. 8, 2020

(87) PCT Pub. No.: WO2020/008688
PCT Pub. Date: Jan. 9, 2020

(65) Prior Publication Data
US 2021/0264584 A1  Aug. 26, 2021

(30) Foreign Application Priority Data
Jul. 5, 2018 (JP) .............................. JP2018-128367

(51) Int. Cl.
*G06T 7/00* (2017.01)
*G06T 7/62* (2017.01)
(Continued)

(52) U.S. Cl.
CPC ............ *G06T 7/0004* (2013.01); *G01M 3/04* (2013.01); *G06T 7/62* (2017.01); *G06T 7/73* (2017.01);
(Continued)

(58) Field of Classification Search
CPC ........... G06T 7/0004; G06T 7/62; G06T 7/73; G06T 2207/10016; G06T 2207/30108;
(Continued)

(56) References Cited

U.S. PATENT DOCUMENTS

2013/0113939 A1* 5/2013 Strandemar ............ H04N 5/332
348/E5.09
2013/0321637 A1* 12/2013 Frank ........................ H04N 5/33
348/152
(Continued)

FOREIGN PATENT DOCUMENTS

JP  7-200049 A  8/1995
JP  9-204221 A  8/1997
(Continued)

OTHER PUBLICATIONS

Niu et al, (Research on the Real-time Leak Monitoring Model of the Long distance natural Gas Pipeline, 2012 Fourth International Conference on Computational and Information Sciences, IEEE, pp. 1368-1371) (Year: 2012).*
(Continued)

*Primary Examiner* — Amara Abdi
(74) *Attorney, Agent, or Firm* — Rankin, Hill & Clark LLP

(57) ABSTRACT

A gas monitoring image recording device, a gas monitoring image recording method, and a gas monitoring image recording program according to the present invention involve: acquiring gas monitoring image data including a plurality of time-series images for use in monitoring a gas leak; extracting a leakage candidate area as a candidate for a gas leak based on the gas monitoring image data acquired; extracting predetermined features related to the gas leak in response to extracting the leakage candidate area; and causing a storage unit to store the features extracted in associa-
(Continued)

tion with the gas monitoring image data from which the leakage candidate area has been extracted.

23 Claims, 6 Drawing Sheets

(51) Int. Cl.
*G06T 7/73* (2017.01)
*G01M 3/04* (2006.01)
*G06V 10/40* (2022.01)
*G06V 20/52* (2022.01)

(52) U.S. Cl.
CPC .............. *G06V 10/40* (2022.01); *G06V 20/52* (2022.01); *G06T 2207/10016* (2013.01); *G06T 2207/30108* (2013.01)

(58) Field of Classification Search
CPC .......... G01M 3/04; G01M 3/002; G01M 3/38; G06V 10/40; G06V 20/52; G06V 10/25; G06F 16/583
See application file for complete search history.

(56) References Cited

U.S. PATENT DOCUMENTS

| | | | |
|---|---|---|---|
| 2016/0238451 A1* | 8/2016 | Zeng | ......................... G01J 5/06 |
| 2020/0116583 A1* | 4/2020 | Hedberg | .................. H04N 5/33 |

FOREIGN PATENT DOCUMENTS

| | | | | |
|---|---|---|---|---|
| JP | 2000-207018 A | | 7/2000 | |
| JP | 2000-310577 A | | 11/2000 | |
| JP | 2000310577 | * | 11/2000 | .............. G01M 3/02 |
| JP | 2012-058093 A | | 3/2012 | |

OTHER PUBLICATIONS

Igal et al, (Leak monitoring system for Gas pipelines, IEEE 1993) (Year: 1993).*
Himanshu et al., (Testbed for Real-time Monitoring of Leak in Low Pressure Gas Pipeline, 2016 IEEE, pp. 459-462) (Year: 2016).*
International Search Report (PCTISA210_B46800) dated May 14, 2019 filed in PCT/JP2019/010999 and its English translation.
PCT Written Opinion of the International Searching Authority (PCTISA237_B46800) dated May 14, 2019 filed in PCT/JP2019/010999 and its English translation.
Morimoto et al., "Optical Gas Imaging (OGI) Gas Leak Monitoring System for Plant Safety", Konica Minolta Technology Report, 2018, vol. 15, pp. 12-16; English abstract and partial English translation; Cited in International Search Report.

* cited by examiner

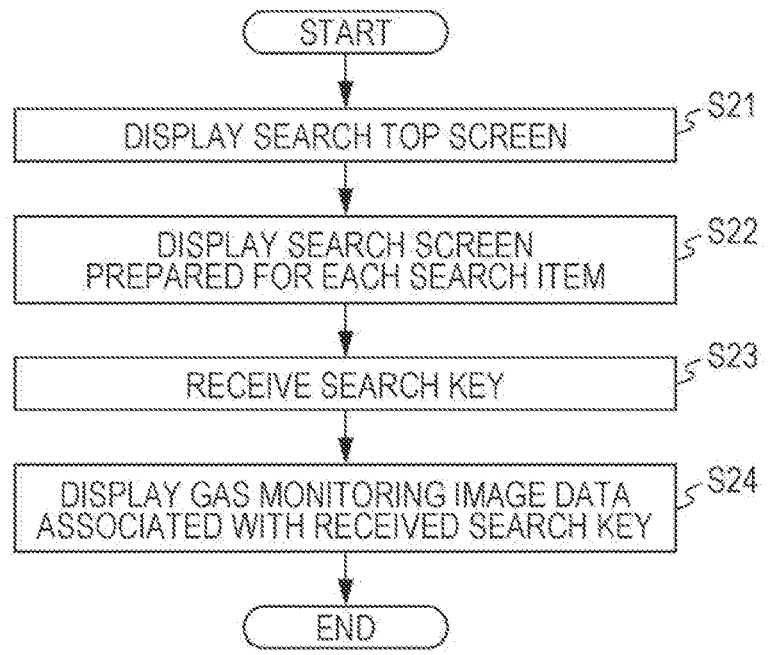
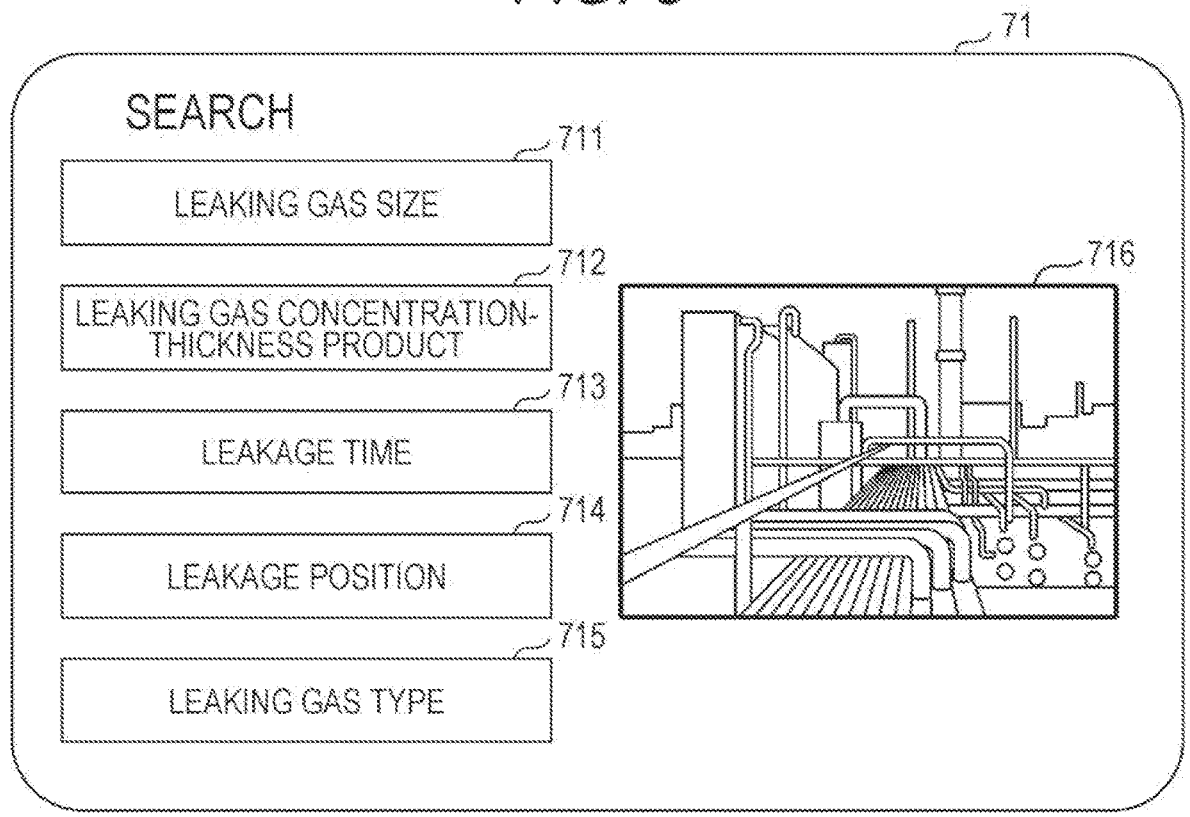

GAS MONITORING IMAGE RECORDING DEVICE, METHOD, AND PROGRAM

TECHNICAL FIELD

The present invention relates to a gas monitoring image recording device, a gas monitoring image recording method, and a gas monitoring image recording program for recording a gas monitoring image for use in monitoring a gas leak.

BACKGROUND ART

Early action is required in the case of leakage of gas such as flammable gas, toxic gas, and organic solvent vapor from a pipe or a tank, for example. For this reason, devices that seek gas such as leaking gas have been researched and developed. One example of such devices is the gas leak detection device disclosed in Patent Literature 1.

The gas leak detection device disclosed in Patent Literature 1 detects a gas leak in an inspection target area, and has an infrared camera that captures the inspection target area, an image processing unit that processes the infrared image captured by the infrared camera, and a gas leak determination unit that determines a gas leak based on the result of processing in the image processing unit. The image processing unit has a fluctuation extraction unit that extracts dynamic fluctuations caused by a gas leak from a plurality of infrared images arranged in time series. The gas leak determination unit determines that a gas leak has occurred in response to the fluctuation extraction unit extracting dynamic fluctuations.

Generally, image data obtained by monitoring a gas leak with a monitoring camera such as the gas leak detection device disclosed in Patent Literature 1 are stored. Such stored image data can be utilized in the event of a gas leak as materials indicating the situation, and/or utilized as materials for maintenance work on gas facilities. However, because image data are usually obtained and stored continuously every day, an enormous amount of image data is accumulated, and thus it is difficult to find target materials (image data) from the enormous volume of image data.

CITATION LIST

Patent Literature

Patent Literature 1: JP 2012-58093 A

SUMMARY OF INVENTION

The present invention has been made in view of the above circumstances, and an object thereof is to provide a gas monitoring image recording device, a gas monitoring image recording method, and a gas monitoring image recording program capable of facilitating search for target image data.

In order to achieve the above-mentioned object, a gas monitoring image recording device, a gas monitoring image recording method, and a gas monitoring image recording program that reflect one aspect of the present invention involve: acquiring gas monitoring image data including a plurality of time-series images for use in monitoring a gas leak: extracting a leakage candidate area as a candidate for a gas leak based on the gas monitoring image data acquired, extracting predetermined features related to the gas leak in response to extracting the leakage candidate area: and causing a storage unit to store the features extracted in association with the gas monitoring image data from which the leakage candidate area has been extracted.

Advantages and features provided by one or more embodiments of the invention are fully understood from the detailed description given below and the accompanying drawings. These detailed description and accompanying drawings are given by way of example only and do not define the limits of the present invention.

BRIEF DESCRIPTION OF DRAWINGS

FIG. 4 is a flowchart illustrating a search operation in the gas monitoring image recording device.

FIG. 5 is a diagram illustrating a search top screen displayed on the gas monitoring image recording device.

DESCRIPTION OF EMBODIMENTS

One or more embodiments of the present invention will now be described with reference to the drawings. However, the scope of the invention is not limited to the disclosed embodiments. It is to be noted that identical components are denoted by the same reference signs in drawings, and the description thereof is omitted as appropriate. In the present specification, components are collectively denoted by reference signs without suffixes, and are distinguished from each other by being denoted by reference signs with suffixes.

Figure 1:
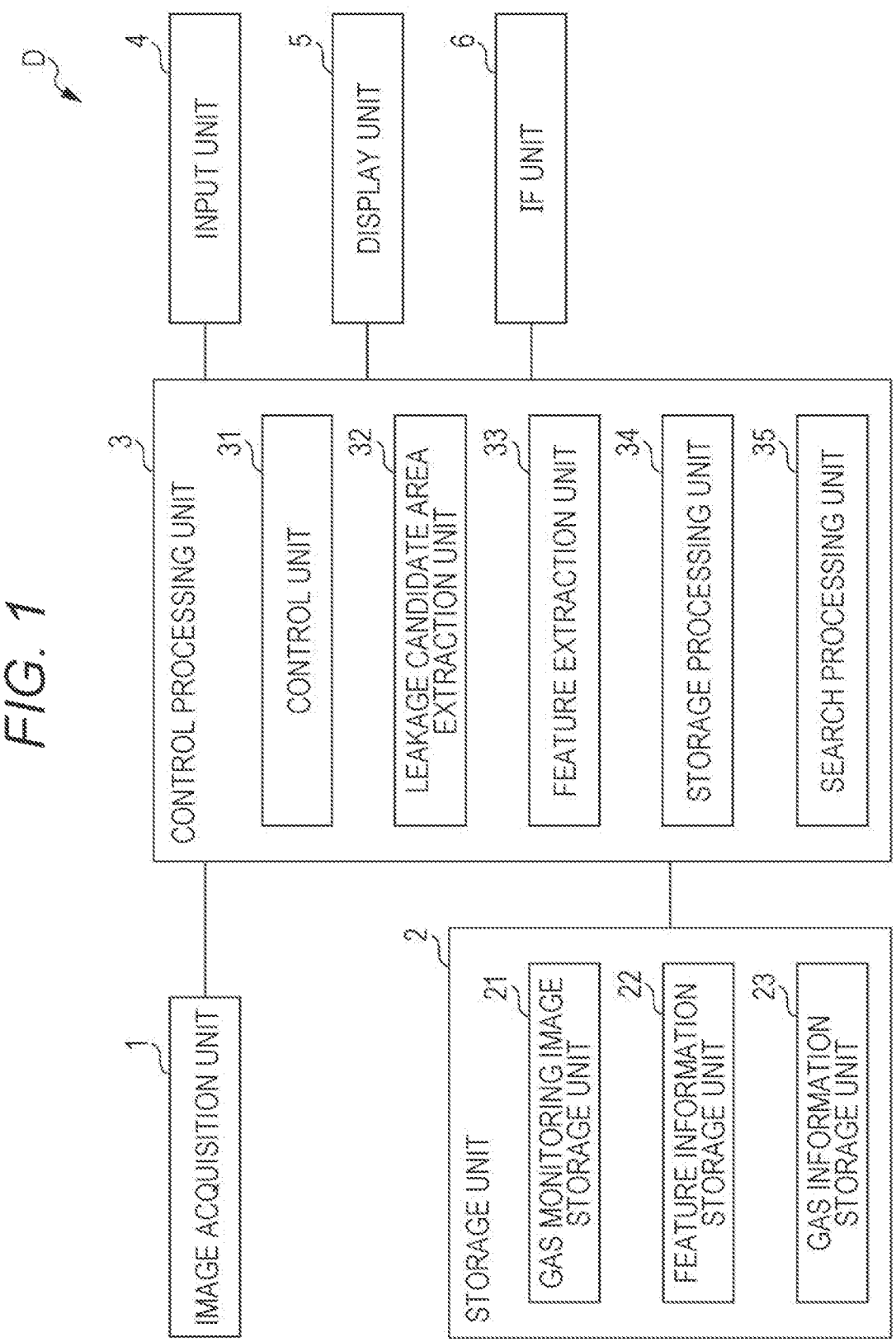
FIG. 1 is a block diagram illustrating a configuration of a gas monitoring image recording device according to an embodiment.
Figure 2:
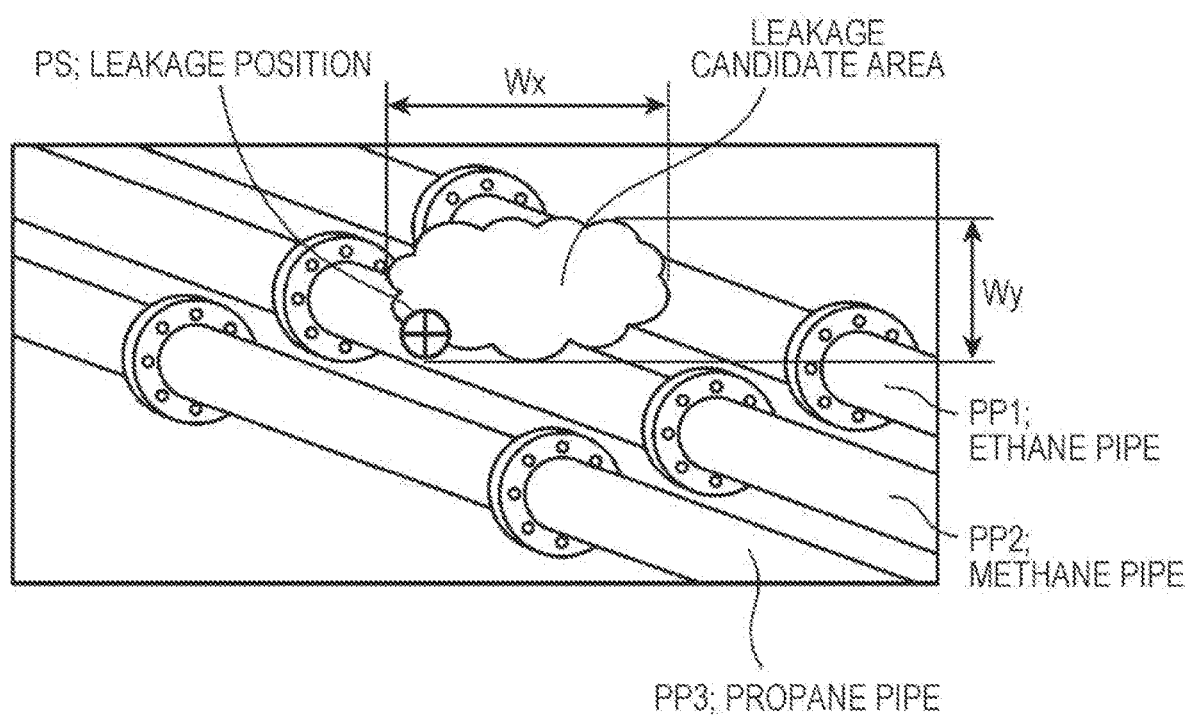
FIG. 2 is a diagram for explaining features in the gas monitoring image recording device.

FIG. 1 is a block diagram illustrating a configuration of a gas monitoring image recording device according to an embodiment. FIG. 2 is a diagram for explaining features in the gas monitoring image recording device.

The gas monitoring image recording device according to the embodiment is a device that causes a storage unit to store, in a searchable manner, image data of gas monitoring images (gas monitoring image data) for use in monitoring a gas leak, and includes, for example, an image acquisition unit 1, a storage unit 2, a control processing unit 3, an input unit 4, a display unit 5, and an interface unit (IF unit) 6, as illustrated in FIG. 1.

The image acquisition unit 1 is a device that is connected to the control processing unit 3 and acquires gas monitoring image data including a plurality of time-series images for use in monitoring a gas leak under the control of the control processing unit 3. Because a gas leak is detected from an infrared image in the present embodiment, the gas monitoring image data are data including a plurality of time-series infrared images generated by capturing a monitoring target area for monitoring a gas leak as a subject using an infrared camera. In the present embodiment, the gas monitoring image data are moving image data of a predetermined time length, and include multiple pieces of gas monitoring image data according to the monitoring time. For example, if a piece of gas monitoring image data is generated every 10 seconds, 6×60×24=8640 pieces of gas monitoring image data are obtained in 24 hours, and 8640×365=3153600 pieces of gas monitoring image data are obtained in one year. In another example, if a piece of gas monitoring image data is generated every 20 seconds, 3×60×24=4320 pieces of gas monitoring image data are obtained in 24 hours, and 4320×365=1576800 pieces of gas monitoring image data are obtained in one year. A freely-determined file name is given to each of the multiple pieces of gas monitoring image data so that they can be distinguished from each other. For example, the time of generation (time of acquisition) of gas monitoring image data is used for a file name.

The image acquisition unit 1 may be, for example, an infrared camera that generates such gas monitoring image data. Alternatively, for example, the image acquisition unit 1 is a communication unit that performs communication, such as a network card, and receives and acquires the gas monitoring image data via a network from an infrared camera that generates the gas monitoring image data. Still alternatively, for example, the image acquisition unit 1 is a communication unit that performs communication, and receives and acquires the gas monitoring image data via a network from a server device that stores and provides the gas monitoring image data. Still alternatively, for example, the image acquisition unit 1 is an interface unit that exchanges data with an external instrument using, for example, the universal serial bus (USB) standard, and reads and acquires the gas monitoring image data, for example, from a storage device such as a USB memory that stores the gas monitoring image data. Still alternatively, for example, the image acquisition unit 1 is a drive device that reads data from a recording medium such as a CD-ROM, and reads and acquires the gas monitoring image data from the recording medium that stores the gas monitoring image data.

The image acquisition unit 1 outputs the acquired gas monitoring image data to the control processing unit 3, and the control processing unit 3 causes the storage unit 2 to store the gas monitoring image data acquired by the image acquisition unit 1.

The input unit 4 is an instrument, e.g., a keyboard and/or a mouse, that is connected to the control processing unit 3 and inputs, to the gas monitoring image recording device D, for example, various commands such as a command to start an associating process for associating a predetermined feature with gas monitoring image data and a command to start a search, and various data necessary for the associating process such as the name of a monitoring target area and/or various data necessary for searching such as a search key. The input unit 4 corresponds to an example of a search key input unit that receives a predetermined feature as a search key. The display unit 5 is a display device, e.g., a CRT display, a liquid crystal display, and an organic EL display, that is connected to the control processing unit 3 and outputs, under the control of the control processing unit 3, commands and/or data input from the input unit 4 and an image of the gas monitoring image data searched by the gas monitoring image recording device D.

Note that the input unit 4 and the display unit 5 may constitute a touch panel. In the configuration of a touch panel, the input unit 4 is a position input device that detects and inputs operation positions using a resistive film technique, a capacitance technique, or the like. The touch panel includes the position input device on the display surface of the display unit 5. One or more input content candidates that can be input are displayed on the display unit 5. In response to the user touching the display position of a desired input content, the position is detected by the position input device, and the display content displayed at the detected position is input to the gas monitoring image recording device D as the user's operation input content. Such a touch panel enables the user to understand the input operation intuitively, making the gas monitoring image recording device D easy for the user to handle.

The IF unit 6 is a circuit that is connected to the control processing unit 3 and exchanges data with an external instrument under the control of the control processing unit 3. For example, the IF unit 6 is an interface circuit based on RS-232C, which is a serial communication technique, an interface circuit based on the Bluetooth (registered trademark) standard, an interface circuit for infrared communication based on the infrared data association (IrDA) standard or the like, an interface circuit based on the universal serial bus (USB) standard, or the like. If the image acquisition unit 1 is the communication unit as exemplified above, the IF unit 6 is not necessary but may be a circuit that communicates with an external instrument, for example, a data communication card, a communication interface circuit conforming to the IEEE 802.11 standard, or the like.

The storage unit 2 is a circuit that is connected to the control processing unit 3 and stores various predetermined programs and various predetermined data under the control of the control processing unit 3.

The various predetermined programs include control processing programs such as a control program, a leakage candidate area extraction program, a feature extraction program, a storage processing program, and a search processing program. The control program is a program for controlling each of the units 1, 2, and 4 to 6 of the gas monitoring image recording device D in accordance with the function of each unit. The leakage candidate area extraction program is a program for extracting a leakage candidate area as a candidate for a gas leak based on the gas monitoring image data acquired by the image acquisition unit 1. The feature extraction program is a program for extracting predetermined features related to the gas leak in response to the leakage candidate area extraction program extracting a leakage candidate area. The storage processing program is a program for causing the storage unit 2 to store the features extracted by the feature extraction program in association with the gas monitoring image data from which the leakage candidate area has been extracted by the leakage candidate area extraction program. The search processing program is a program for searching for a feature corresponding to the search key received by the input unit 4 from among a plurality of features stored in the storage unit 2 in association with gas monitoring image data from which a leakage candidate area has been extracted by the leakage candidate area extraction program, retrieving gas monitoring image data associated with the feature found, from which a leakage candidate area has been extracted by the leakage candidate area extraction program, and displaying the gas monitoring image data on the display unit 5.

The various predetermined data include, for example, data necessary for executing each program such as multiple pieces of gas monitoring image data acquired by the image acquisition unit 1, feature information, and gas information.

The storage unit 2 includes, for example, a read only memory (ROM) which is a non-volatile storage element, an electrically erasable programmable read only memory (EEPROM) which is a rewritable non-volatile storage element, or the like. The storage unit 2 includes a random access memory (RAM) or the like that serves as what is called a working memory for the control processing unit 3 in which data or like generated during the execution of the predetermined programs are stored. The storage unit 2 may include a hard disk device that can store a relatively large amount of data. The storage unit 2 also functionally includes a gas monitoring image storage unit 21, a feature information storage unit 22, and a gas information storage unit 23 in order to store multiple pieces of gas monitoring image data, feature information, and gas information, respectively.

The gas monitoring image storage unit 21 stores, with predetermined file names, multiple pieces of gas monitoring image data acquired by the image acquisition unit 1.

The feature information storage unit 22 stores feature information representing a feature associated with gas monitoring image data by the storage processing program. Features will be described later. For example, the feature information storage unit 22 stores an electronic file containing feature information and the file name of the gas monitoring image data associated with the feature information with a freely-determined file name so that it can be distinguished from other files. Alternatively, for example, the feature information storage unit 22 stores an electronic file containing feature information with the same file name as the file name of the gas monitoring image data associated with the feature information, except for the extension. Still alternatively, for example, the feature information storage unit 22 stores feature information by incorporating it in the file name of the gas monitoring image data associated with the feature information. In this case, the feature information storage unit 22 also serves as the gas monitoring image storage unit 21. Still alternatively, for example, the feature information storage unit 22 stores feature information by incorporating it in the electronic file of the gas monitoring image data associated with the feature information. An example of an electronic file of moving image data that can contain such metadata (feature information in the present embodiment) is an mp4 electronic file. In this case, as described above, the feature information storage unit 22 also serves as the gas monitoring image storage unit 21. In a case where feature information is stored by being incorporated in the file name of gas monitoring image data or a case where feature information is stored by being incorporated in the electronic file of gas monitoring image data, it is preferable that the feature information be encoded, for example, so that the amount of data can be compressed. In this case, the correspondence between the feature information and the code is stored in the storage unit 2.

The gas information storage unit 23 stores gas information related to gas necessary for extracting features. In the present embodiment, the gas information is exemplified by position shape information representing the arrangement position and shape of a gas installation (gas facility) arranged in a monitoring target area for monitoring a gas leak, and gas type information representing the gas type of gas in the gas installation. The gas installation (gas facility) is, for example, a pipe, a tank, a valve, or the like. The position shape information is stored in the gas information storage unit 23 by associating an identifier (gas installation ID) such as the name of the gas installation for identifying the gas installation with each of the position and shape of the gas installation. The occupied area of the gas installation is computed based on the data of the position and shape of the gas installation. The position may be an actual coordinate value represented by a coordinate system set in the monitoring target area, but is preferably represented by a pixel position in an image obtained by capturing the monitoring target area as a subject. This makes it possible to easily identify the gas installation that has caused the gas leak from the leakage position obtained from the image. The gas type information is stored in the gas information storage unit 23 by associating the gas installation ID with the gas type of gas (kind of gas) in the gas installation.

The control processing unit 3 is a circuit for controlling each of the units 1, 2, and 4 to 6 of the gas monitoring image recording device D in accordance with the function thereof so as to cause the storage unit 2 to store, in a searchable manner, gas monitoring image data for use in monitoring a gas leak. More specifically, with the execution of the predetermined control processing programs, the control processing unit 3 according to the present embodiment functionally includes a control unit 31, a leakage candidate area extraction unit 32, a feature extraction unit 33, a storage processing unit 34, and a search processing unit 35.

The control unit 31 controls each of the units 1, 2, and 4 to 6 of the gas monitoring image recording device D in accordance with the function thereof for overall control of the gas monitoring image recording device D.

The leakage candidate area extraction unit 32 extracts a leakage candidate area as a candidate for a gas leak based on the gas monitoring image data acquired by the image acquisition unit 1. The extraction of a leakage candidate area is performed using, for example, a well-known method such as the method disclosed in JP 5343054 B (JP 2012-058093 A), the method disclosed in WO 2017/073426 A. or the method disclosed in WO 2017/073430 A.

The feature extraction unit 33 extracts predetermined features related to a gas leak in response to the leakage candidate area extraction unit 32 extracting a leakage candidate area.

The features include, for example, as illustrated in FIG. 2, a leakage position PS, i.e. a position where gas is leaking. The feature extraction unit 33 extracts a leakage position based on a leakage candidate area extracted by the leakage candidate area extraction unit 32. For example, the feature extraction unit 33 extracts, as a leakage position, the position (or the central position) of the first-extracted leakage candidate area among the leakage candidate areas continuously extracted in time series. The feature extraction unit 33 extracts a leakage position using the method disclosed in WO 2017/073426 A, for example.

The features also include, for example, a gas type, i.e. the kind of leaking gas. The feature extraction unit 33 extracts a leakage position based on a leakage candidate area extracted by the leakage candidate area extraction unit 32, extracts the gas installation corresponding to the extracted leakage position based on the extracted leakage position and the position shape information stored in the gas information storage unit, and extracts the gas type corresponding to the extracted gas installation based on the extracted facility and the gas type information stored in the gas information storage unit. It is assumed that the distance between the infrared camera that has generated gas monitoring image data and the monitoring target area, the angle of view of the infrared camera, and the like are known. More specifically, in the present embodiment, the feature extraction unit 33 first extracts a leakage position based on a leakage candidate area extracted by the leakage candidate area extraction unit 32 using the above method. Next, the feature extraction unit 33 selects (searches for) the gas installation ID corresponding to the extracted leakage position from the position shape information stored in the gas information storage unit. The feature extraction unit 33 then selects (searches for) the gas type corresponding to the selected gas installation ID from the gas type information stored in the gas information storage unit. As a result, the gas type of leaking gas is extracted. For example, as illustrated in FIG. 2, if the leakage position PS of leaking gas is extracted on a methane pipe PP2, methane is extracted as the gas type.

The features also include, for example, a leakage scale, i.e. the scale of leaking gas. The feature extraction unit 33 extracts a leakage scale based on a leakage candidate area extracted by the leakage candidate area extraction unit 32. The leakage scale includes at least one of the gas cloud size, concentration-thickness product, and time of appearance of leaking gas. The feature extraction unit 33 computes, as the gas cloud size, the size of a leakage candidate area extracted by the leakage candidate area extraction unit 32. For example, as illustrated in FIG. 2, the feature extraction unit 33 computes, as the gas cloud size, a horizontal length Wx and a vertical length Wy of a leakage candidate area extracted by the leakage candidate area extraction unit 32 (gas cloud size=Wx×Wy). The feature extraction unit 33 computes the concentration-thickness product of leaking gas using the method disclosed in WO 2017/104607 A or the method disclosed in WO 2017/073429 A, for example. The feature extraction unit 33 computes the time of appearance of leaking gas from the difference between the times of extraction of the first-extracted leakage candidate area and the last-extracted leakage candidate area among the leakage candidate areas continuously extracted in time series.

The storage processing unit 34 causes the storage unit 2 to store features extracted by the feature extraction unit 33 in association with the gas monitoring image data from which the leakage candidate area has been extracted by the leakage candidate area extraction unit 32.

For example, the storage processing unit 34 causes the feature information storage unit 22 of the storage unit 2 to store an electronic file containing a feature extracted by the feature extraction unit 33 in association with the gas monitoring image data from which the leakage candidate area has been extracted by the leakage candidate area extraction unit 32. More specifically, the storage processing unit 34 causes the feature information storage unit 22 to store an electronic file containing feature information representing a feature extracted by the feature extraction unit 33 and the file name of the gas monitoring image data associated with the feature information with a freely-determined file name so that it can be distinguished from other files. Alternatively, the storage processing unit 34 causes the feature information storage unit 22 to store an electronic file containing feature information representing a feature extracted by the feature extraction unit 33 with the same file name as the file name of the gas monitoring image data associated with the feature information, except for the extension.

Still alternatively, for example, the storage processing unit 34 incorporates feature information representing a feature extracted by the feature extraction unit 33 in the file name of the gas monitoring image data associated with the feature information.

Still alternatively, for example, the storage processing unit 34 incorporates feature information representing a feature extracted by the feature extraction unit 33 in the electronic file of the gas monitoring image data associated with the feature information.

The search processing unit 35 searches for a feature corresponding to the search key received by the input unit 4 from among a plurality of features stored in the feature information storage unit 22 of the storage unit 2 in association with gas monitoring image data from which a leakage candidate area has been extracted by the leakage candidate area extraction unit 32, retrieves gas monitoring image data associated with the feature found, from which a leakage candidate area has been extracted by the leakage candidate area extraction unit 32, and displays the gas monitoring image data on the display unit 5.

For example, as the search key, the input unit 4 receives a search position or a search area, i.e. the leakage position to be searched for. More specifically, the display unit 5 displays a monitoring target area image obtained by capturing a monitoring target area for monitoring a gas leak as a subject, and the input unit 4 receives designation of a search position or a search area as the search key in the monitoring target area displayed on the display unit 5. The search processing unit 35 searches for a leakage position corresponding to the search position or search area received as the search key by the input unit 4 from among a plurality of leakage positions stored in the feature information storage unit 22 of the storage unit 2 in association with gas monitoring image data from which a leakage candidate area has been extracted by the leakage candidate area extraction unit 32, retrieves gas monitoring image data associated with the leakage position found, from which a leakage candidate area has been extracted by the leakage candidate area extraction unit 32, and displays the gas monitoring image data on the display unit 5. More specifically, the search processing unit 35 superimposes, on the gas monitoring image data retrieved, the leakage position as the feature found, and displays the gas monitoring image data retrieved on the display unit 5.

As the search key, for example, the input unit 4 also receives a search gas type. i.e. the gas type to be searched for. The search processing unit 35 searches for a gas type corresponding to the search gas type received as the search key by the input unit 4 from among a plurality of gas types stored in the feature information storage unit 22 of the storage unit 2 in association with gas monitoring image data from which a leakage candidate area has been extracted by the leakage candidate area extraction unit 32, retrieves gas monitoring image data associated with the gas type found, from which a leakage candidate area has been extracted by the leakage candidate area extraction unit 32, and displays the gas monitoring image data on the display unit 5.

As the search key, for example, the input unit 4 also receives a search leakage scale, i.e. the leakage scale to be searched for. The search leakage scale includes at least one of the gas cloud size, concentration-thickness product, and time of appearance of leaking gas. The search processing unit 35 searches for a leakage scale corresponding to the search leakage scale received as the search key by the input unit 4 from among a plurality of leakage scales stored in the feature information storage unit 22 of the storage unit 2 in association with gas monitoring image data from which a leakage candidate area has been extracted by the leakage candidate area extraction unit 32, retrieves gas monitoring image data associated with the leakage scale found, from which a leakage candidate area has been extracted by the leakage candidate area extraction unit 32, and displays the gas monitoring image data on the display unit 5. More specifically, in a case where the search leakage scale is the gas cloud size, the search processing unit 35 searches for a gas cloud size corresponding to the search gas cloud size received as the search key by the input unit 4 from among a plurality of gas cloud sizes stored in the feature information storage unit 22 of the storage unit 2 in association with gas monitoring image data from which a leakage candidate area has been extracted by the leakage candidate area extraction unit 32, retrieves gas monitoring image data associated with the gas cloud size found, from which a leakage candidate area has been extracted by the leakage candidate area extraction unit 32, and displays the gas monitoring image data on the display unit 5. In a case where the search leakage scale is the concentration-thickness product, the search processing unit 35 searches for a concentration-thickness product corresponding to the search concentration-thickness product received as the search key by the input unit 4 from among a plurality of concentration-thickness products stored in the feature information storage unit 22 of the storage unit 2 in association with gas monitoring image data from which a leakage candidate area has been extracted by the leakage candidate area extraction unit 32, retrieves gas monitoring image data associated with the concentration-thickness product found, from which a leakage candidate area has been extracted by the leakage candidate area extraction unit 32, and displays the gas monitoring image data on the display unit 5. In a case where the search leakage scale is the time of appearance, the search processing unit 35 searches for a time of appearance corresponding to the search appearance time received as the search key by the input unit 4 from among a plurality of times of appearance stored in the feature information storage unit 22 of the storage unit 2 in association with gas monitoring image data from which a leakage candidate area has been extracted by the leakage candidate area extraction unit 32, retrieves gas monitoring image data associated with the time of appearance found, from which a leakage candidate area has been extracted by the leakage candidate area extraction unit 32, and displays the gas monitoring image data on the display unit 5.

The above-mentioned the gas monitoring image recording device D can be configured by a computer of the desktop type or node type, except for the image acquisition unit 1.

Figure 3:
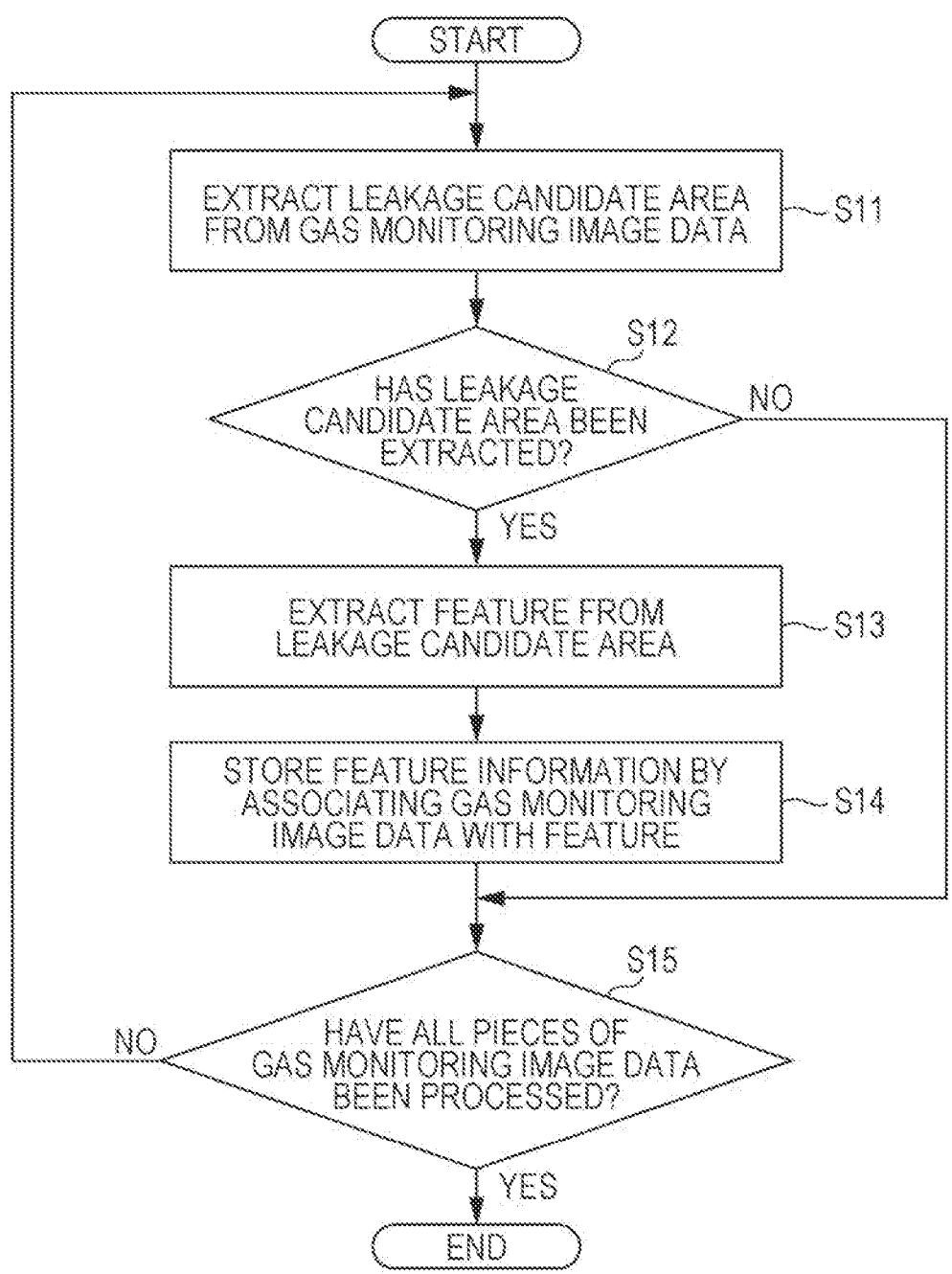
FIG. 3 is a flowchart illustrating an operation of associating features with gas monitoring image data in the gas monitoring image recording device.
Figure 6:
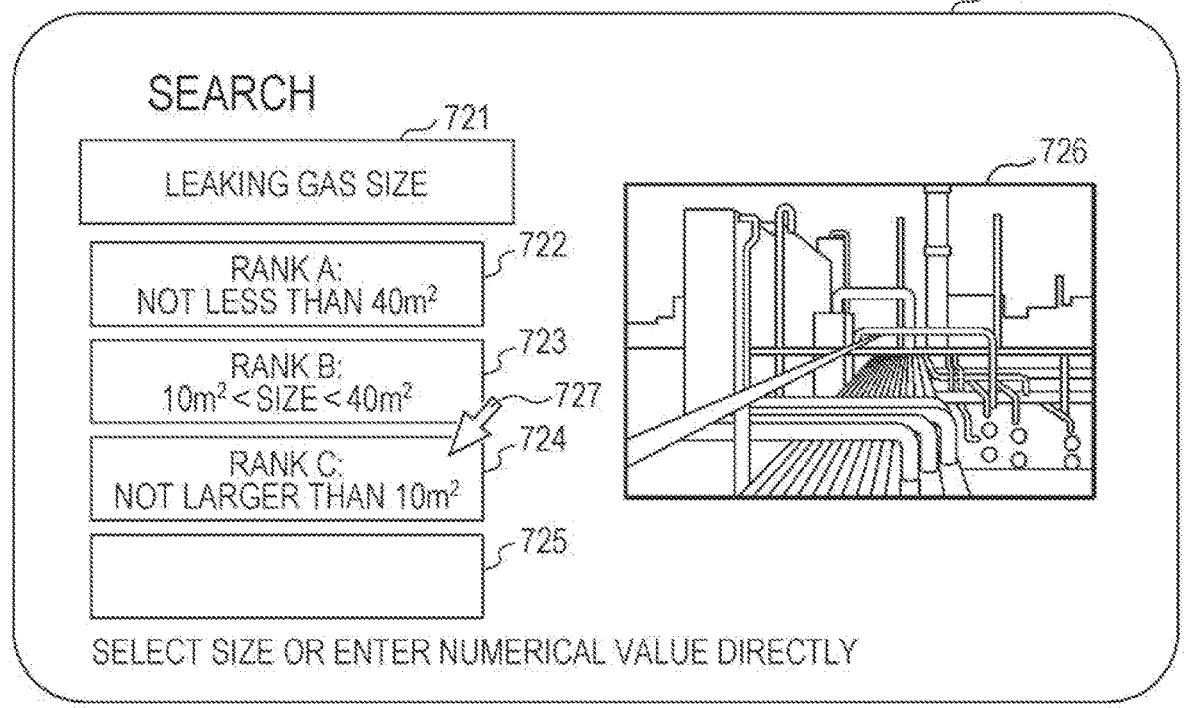
FIG. 6 is a diagram illustrating a gas cloud size search screen displayed on the gas monitoring image recording device.
Figure 7:
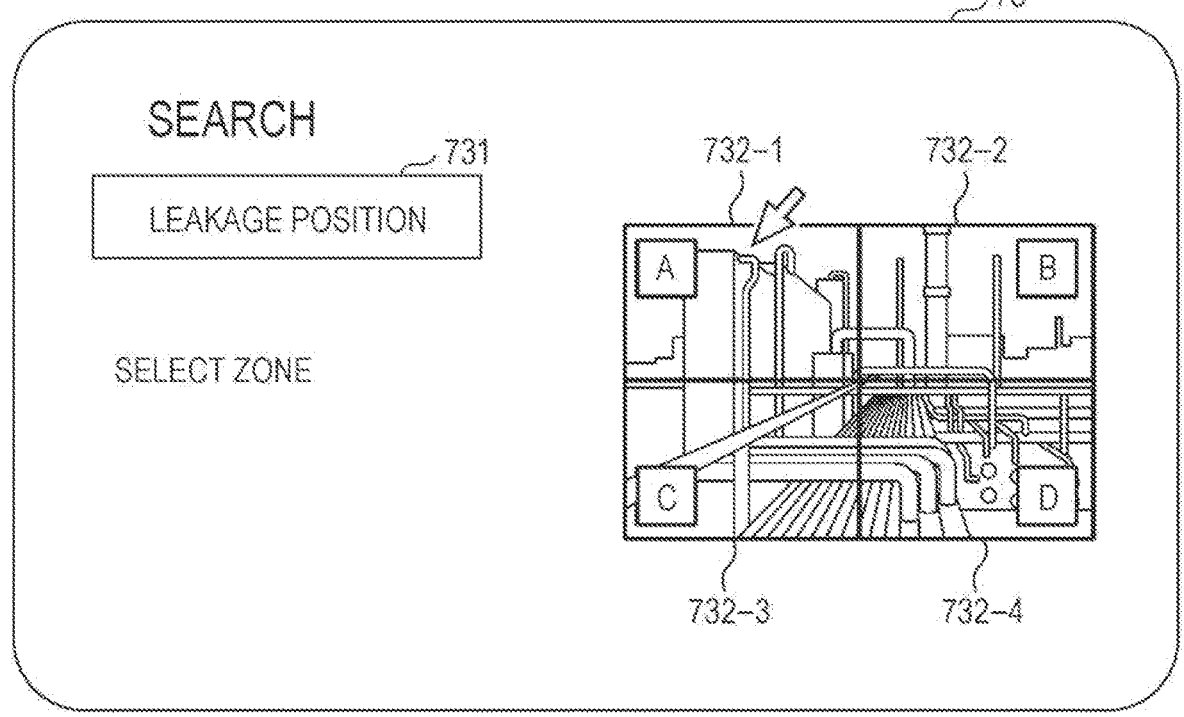
FIG. 7 is a diagram illustrating a leakage position search screen displayed on the gas monitoring image recording device.
Figure 8:
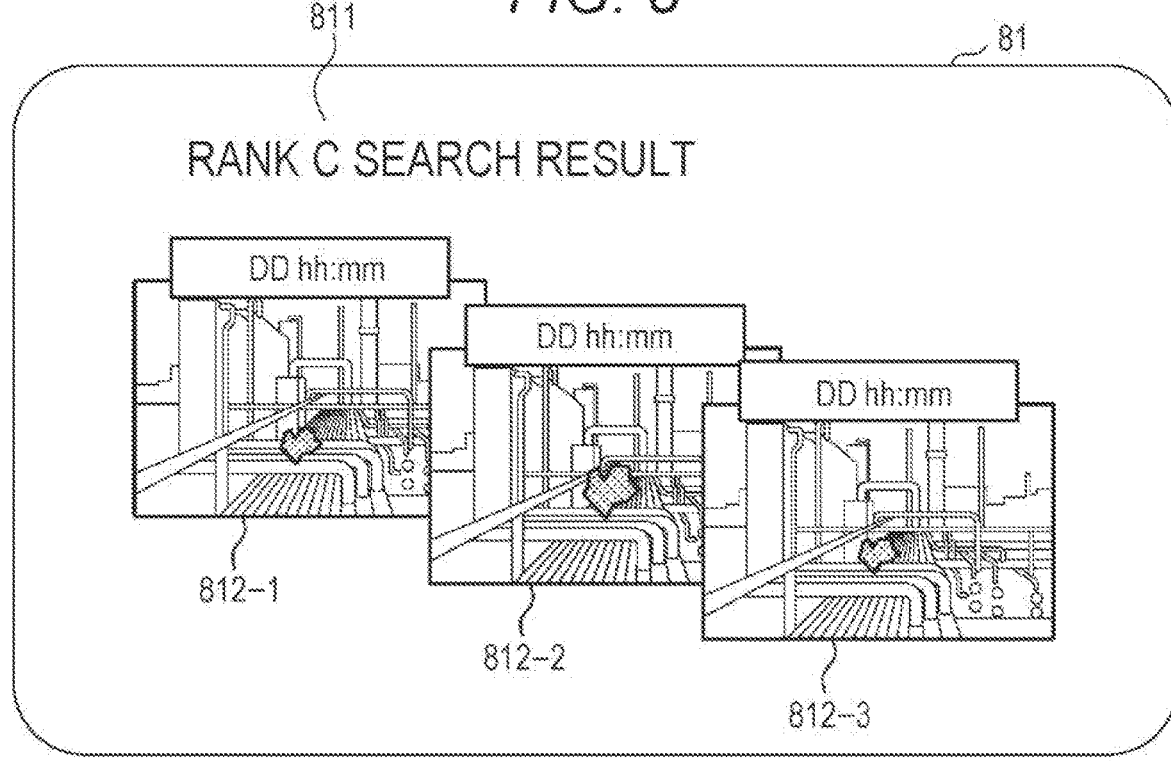
FIG. 8 is a diagram illustrating a size search result screen displayed on the gas monitoring image recording device, showing results of search by gas cloud size.
Figure 9:
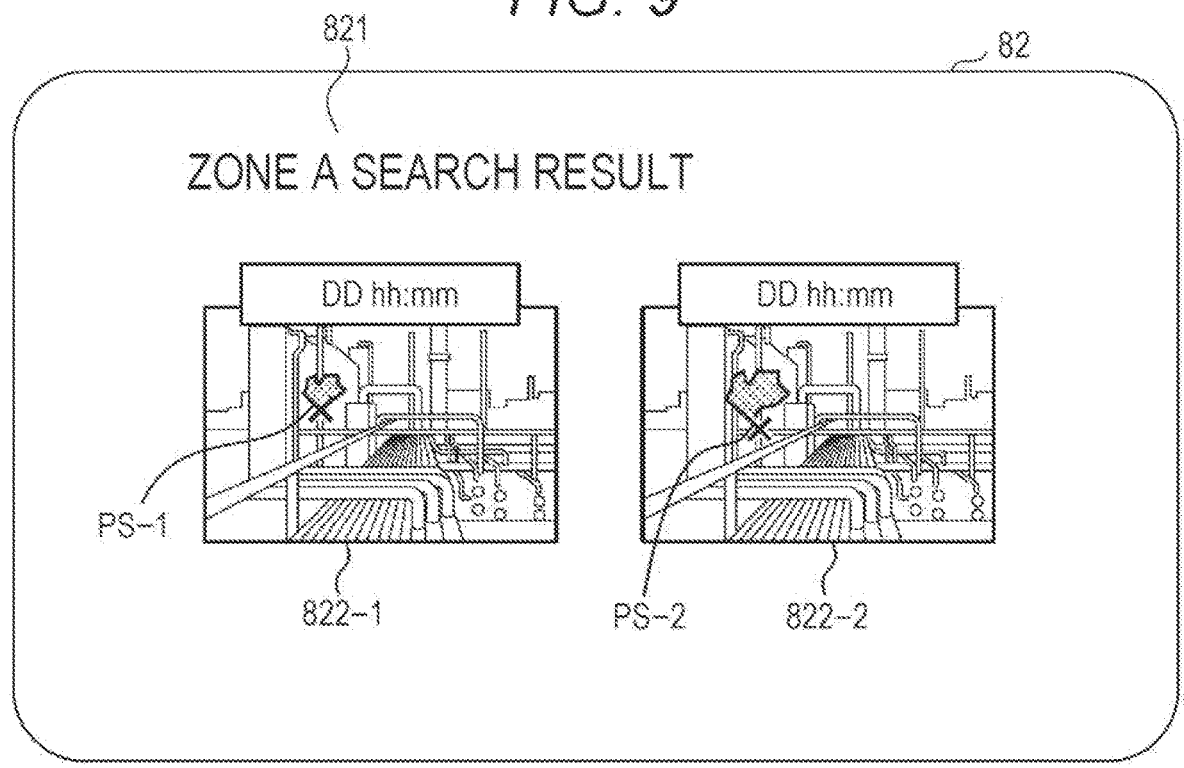
FIG. 9 is a diagram illustrating a position search result screen displayed on the gas monitoring image recording device, showing results of search by leakage position.

Next, operations according to the present embodiment will be described. FIG. 3 is a flowchart illustrating an operation of associating features with gas monitoring image data in the gas monitoring image recording device. FIG. 4 is a flowchart illustrating a search operation in the gas monitoring image recording device. FIG. 5 is a diagram illustrating a search top screen displayed on the gas monitoring image recording device. FIG. 6 is a diagram illustrating a gas cloud size search screen displayed on the gas monitoring image recording device. FIG. 7 is a diagram illustrating a leakage position search screen displayed on the gas monitoring image recording device. FIG. 8 is a diagram illustrating a size search result screen displayed on the gas monitoring image recording device, showing results of search by gas cloud size. FIG. 9 is a diagram illustrating a position search result screen displayed on the gas monitoring image recording device, showing results of search by leakage position.

After being powered on, the gas monitoring image recording device D having the above-mentioned configuration initializes necessary units and starts its operation. With the execution of the control processing programs, the control processing unit 3 functionally configures the control unit 31, the leakage candidate area extraction unit 32, the feature extraction unit 33, the storage processing unit 34, and the search processing unit 35. Here, suppose that multiple pieces of gas monitoring image data have been acquired by the image acquisition unit 1, and the acquired multiple pieces of gas monitoring image data have been stored with file names in the gas monitoring image storage unit 21 of the storage unit 2.

In the operation of associating features with gas monitoring image data in the gas monitoring image recording device D, in FIG. 3, the leakage candidate area extraction unit 32 of the control processing unit 3 of the gas monitoring image recording device D retrieves, in time-series order, multiple pieces of gas monitoring image data stored in the gas monitoring image storage unit 21 of the storage unit 2, and executes the process of extracting a leakage candidate area based on the retrieved gas monitoring image data (S11).

Then, the control processing unit 3 of the gas monitoring image recording device D determines whether a leakage candidate area has been extracted in step S11 (S12). If the result of this determination is that no leakage candidate area has been extracted (No), the gas monitoring image recording device D executes step S15. If the result of this determination is that a leakage candidate area has been extracted (Yes), the gas monitoring image recording device D sequentially executes steps S13, S14, and S15.

In step S13, the feature extraction unit 33 of the control processing unit 3 of the gas monitoring image recording device D extracts predetermined features. In the present embodiment, the feature extraction unit 33 extracts, as the features, the leakage position, gas type, and leakage scale (gas cloud size, concentration-thickness product, and time of appearance) based on the leakage candidate area extracted by the leakage candidate area extraction unit 32.

Next, in step S14, the storage processing unit 34 of the control processing unit 3 of the gas monitoring image recording device D causes the feature information storage unit 22 of the storage unit 2 to store the features extracted by the feature extraction unit 33 in step S13 in association with the gas monitoring image data from which the leakage candidate area has been extracted by the leakage candidate area extraction unit 32 in step S11.

Then, in step S15, the control processing unit 3 of the gas monitoring image recording device D determines whether all pieces of gas monitoring image data stored in the gas monitoring image storage unit 21 of the storage unit 2 have been processed. If the result of this determination is that all pieces of gas monitoring image data have been processed (Yes), the gas monitoring image recording device D ends this procedure. If the result of this determination is that not all pieces of gas monitoring image data have been processed (No), the gas monitoring image recording device D returns the procedure to step S1.

Through this operation, the gas monitoring image recording device D associates the features with the gas monitoring image data from which the leakage candidate area has been extracted.

In the above description, each step is executed on multiple pieces of gas monitoring image data acquired in advance by the image acquisition unit 1 and stored in the gas monitoring image storage unit 21 of the storage unit 2. Alternatively, while acquiring gas monitoring image data at the image acquisition unit 1, each step may be performed on the gas monitoring image data immediately after the acquisition.

In the search operation in the gas monitoring image recording device D, in FIG. 4, the search processing unit 35 of the control processing unit 3 of the gas monitoring image recording device D first displays a search top screen on the display unit 5 (S21).

The search top screen is a screen for selecting a search item to be searched for and inputting the search item to be searched to the gas monitoring image recording device D.

Such a search top screen 71 includes, for example, a "leaking gas size" button 711, a "leaking gas concentration-thickness product" button 712, a "leakage time" button 713, a "leakage position" button 714, a "leaking gas type" button 715, and a monitoring target image display area 716 that displays a captured image of the monitoring target area, as illustrated in FIG. 5. The "leaking gas size" button 711 is a button for selecting the gas cloud size of leaking gas as a search item for input to the gas monitoring image recording device D. The "leaking gas concentration-thickness product" button 712 is a button for selecting the concentration-thickness product of leaking gas as a search item for input to the gas monitoring image recording device D. The "leakage time" button 713 is a button for selecting the time of appearance of leaking gas as a search item for input to the gas monitoring image recording device D. The "leakage position" button 714 is a button for selecting the leakage position of leaking gas as a search item for input to the gas monitoring image recording device D. The "leaking gas type" button 715 is a button for selecting the gas type of leaking gas as a search item for input to the gas monitoring image recording device D.

The user (searcher) performs an input operation to select a search item on the search top screen. Upon receiving a search item input operation, the search processing unit 35 of the gas monitoring image recording device D displays a search screen prepared for each search item on the display unit 5 (S22).

For example, upon receiving an input operation for the "leaking gas size" button 711 from the user such as moving a mouse cursor 727 to the "leaking gas size" button 711 and left double-clicking, the search processing unit 35 causes the display unit 5 to leave the search top screen 71 and display a gas cloud size search screen for receiving a gas cloud size as a search key. The gas cloud size search screen 72 includes, for example, a search item name display area 721 for displaying a search item name such as "leaking gas size", search key input units 722 to 725 for inputting a gas cloud size to be searched for (search gas cloud size) as a search key to the gas monitoring image recording device D, and a monitoring target image display area 726 similar to the monitoring target image display area 716, as illustrated in FIG. 6. In the example illustrated in FIG. 6, the search key input units 722 to 725 include the first to third search key input units 722 to 724 with predefined search gas cloud sizes, and the fourth search key input unit 725 that allows numerical input of a search gas cloud size. The first search key input unit 722 is a button for inputting a search gas cloud size range of not less than 40 $m^2$ to the gas monitoring image recording device D, which is represented in FIG. 6 by the "rank A: not less than 40 n" button. The second search key input unit 723 is a button for inputting a search gas cloud size range of larger than 10 $m^2$ and less than 40 $m^2$ to the gas monitoring image recording device D, which is represented in FIG. 6 by the "rank B: 10 $m^2$<size <40 $m^2$" button. The third search key input unit 724 is a button for inputting a search gas cloud size range of not larger than 10 $m^2$ to the gas monitoring image recording device D, which is represented in FIG. 6 by the "rank C: not larger than 10 $m^2$" button. The fourth search key input unit 725 is a numerical value input box for inputting a numerical value to the gas monitoring image recording device D.

Upon receiving an input operation for the "leaking gas concentration-thickness product" button 712, for example, the search processing unit 35 causes the display unit 5 to leave the search top screen 71 and display a concentration-thickness product search screen for receiving a concentration-thickness product as a search key. The concentration-thickness product search screen includes a search item name display area for displaying a search item name such as "concentration-thickness product" and a search key input unit for inputting a concentration-thickness product to be searched for (search concentration-thickness product) as a search key to the gas monitoring image recording device D. The search key input unit is, for example, a numerical value input box for inputting a numerical value to the gas monitoring image recording device D.

Upon receiving an input operation for the "leakage time" button 713, for example, the search processing unit 35 causes the display unit 5 to leave the search top screen 71 and display an appearance time search screen for receiving a time of appearance as a search key. The appearance time search screen includes a search item name display area for displaying a search item name such as "leakage time" and a search key input unit for inputting a time of appearance to be searched for (search appearance time) as a search key to the gas monitoring image recording device D. The search key input unit is, for example, a numerical value input box for inputting a numerical value to the gas monitoring image recording device D.

Upon receiving an input operation for the "leakage position" button 714, for example, the search processing unit 35 causes the display unit 5 to leave the search top screen 71 and display a leakage position search screen for receiving a leakage position as a search key. The leakage position search screen 73 includes, for example, a search item name display area 731 for displaying a search item name such as "leakage position" and a search key input unit 732 (732-1 to 732-4) for inputting a position to be searched for (search position) as a search key to the gas monitoring image recording device D, as illustrated in FIG. 7. In the present embodiment, the search key input unit 732 includes an area that displays an image of the monitoring target area so that the user can designate and input a search position with reference to the image of the monitoring target area. A search position may be input to the gas monitoring image recording device D by performing an input operation to designate a search position on an image of the monitoring target area (for example, an operation of moving the mouse cursor to the search position and left double-clicking). In the present embodiment, however, an area to be searched (search area) is input as a search key to the gas monitoring image recording device D. More specifically, as illustrated in FIG. 7, the search key input unit 732 includes the first to fourth search key input units 732-1 to 7324, which are obtained by dividing the area displaying an image of the monitoring target area into four. The first search key input unit 732-1 is a button for inputting the upper left half of the monitoring target area as a search area to the gas monitoring image recording device D. The second search key input unit 732-2 is a button for inputting the upper right half of the monitoring target area as a search area to the gas monitoring image recording device D. The third search key input unit 732-3 is a button for inputting the lower left half of the monitoring target area as a search area to the gas monitoring image recording device D. The fourth search key input unit 732-4 is a button for inputting the lower right half of the monitoring target area as a search area to the gas monitoring image recording device D. Note that by designating two vertices of a rectangle on an image of the monitoring target area, the rectangular search area may be input.

Upon receiving an input operation for the "leaking gas type" button 715, for example, the search processing unit 35 causes the display unit 5 to leave the search top screen 71 and display a gas type search screen for receiving a gas type as a search key. The gas type search screen includes a search item name display area for displaying a search item name such as "leaking gas type" and a search key input unit for inputting a gas type to be searched for (search gas type) as a search key to the gas monitoring image recording device D. The search key input unit is, for example, a text input box for inputting text to the gas monitoring image recording device D.

Returning to FIG. 4, in response to receiving input of a search key from the input unit 4 using the search screen prepared for each search item (S23), the search processing unit 35 of the gas monitoring image recording device D searches for a feature corresponding to the search key received by the input unit 4 from among a plurality of features stored in the feature information storage unit 22 of the storage unit 2, retrieves the gas monitoring image data associated with the found feature, displays the gas monitoring image data on the display unit 5 (S24), and ends the procedure.

For example, in response to receiving in step S23 an input operation for the "rank C: not larger than 10 m$^2$" button of the third search key input unit 724 on the gas cloud size search screen 72 illustrated in FIG. 6, the search processing unit 35 selects (searches for) in step S24 feature information having a gas cloud size of not larger than 10 m$^2$ from among multiple pieces of feature information stored in the feature information storage unit 22, retrieves the gas monitoring image data associated with the selected feature from the gas monitoring image storage unit 21, and displays a gas monitoring image of the retrieved gas monitoring image data on the display unit 5. For example, a gas monitoring image of the retrieved gas monitoring image data is displayed on the display unit 5 using a size search result screen 81 that displays results of search by gas cloud size, as illustrated in FIG. 8. The size search result screen 81 includes a screen title area 811 for displaying a screen title such as "rank C search result" and a search result area 812 for display ing search results. The example illustrated in FIG. 8 shows that three (first to third) pieces of gas monitoring image data have been found in step S24. The search result area 812 includes a first search result area 812-1, a second search result area 812-2, and a third search result area 812-3. The first search result area 812-1 displays a gas monitoring image of the first piece of gas monitoring image data (for example, a gas monitoring image (or one of a plurality of gas monitoring images or a moving image) of the first piece of gas monitoring image data from which a leakage candidate area has been extracted). The second search result area 812-2 displays a gas monitoring image of the second piece of gas monitoring image data. The third search result area 812-3 displays a gas monitoring image of the third piece of gas monitoring image data. In the example illustrated in FIG. 8, each gas leakage occurrence time is also displayed in the corresponding one of the search result areas 812-1 to 812-3.

Alternatively, for example, in response to receiving in step S23 an input operation for the first search key input unit 732-1 on the leakage position search screen 73 illustrated in FIG. 7, the search processing unit 35 selects (searches for) in step S24 feature information having a leakage position within the upper left half area of a gas monitoring image among multiple pieces of feature information stored in the feature information storage unit 22, retrieves the gas monitoring image data associated with the selected feature information from the gas monitoring image storage unit 21, and displays a gas monitoring image of the retrieved gas monitoring image data on the display unit 5. For example, a gas monitoring image of the retrieved gas monitoring image data is displayed on the display unit 5 using a position search result screen 82 that displays results of search by leakage position, as illustrated in FIG. 9. The position search result screen 82 includes a screen title area 821 for displaying a screen title such as "zone A search result" and a search result area 822 for displaying search results. The example illustrated in FIG. 9 shows that two (first and second) pieces of gas monitoring image data have been found in step S24. The search result area 822 includes a first search result area 822-1 and a second search result area 822-2. The first search result area 822-1 displays a gas monitoring image of the first piece of gas monitoring image data (for example, a gas monitoring image (or one of a plurality of gas monitoring images or a moving image) of the first piece of gas monitoring image data from which a leakage candidate area has been extracted). The second search result area 822-2 displays a gas monitoring image of the second piece of gas monitoring image data. In the example illustrated in FIG. 9, each gas leakage occurrence time is also displayed in the corresponding one of the search result areas 822-1 and 822-2. Further, in the example illustrated in FIG. 9, leakage positions PS-1 and PS-2 specified by the selected pieces of feature information are respectively displayed in the search result areas 822-1 and 822-2 by being superimposed on the gas monitoring images with x marks.

In the above description, search results are displayed on the display unit 5 by displaying gas monitoring images of gas monitoring image data. Alternatively, search results may be displayed on the display unit 5 as a list of file names of gas monitoring image data. Because the time of generation (time of acquisition) of gas monitoring image data is used for a file name as described above, the time of generation (time of acquisition) may be displayed as illustrated in FIGS. 8 and 9. In addition, in a case where the time of generation (time of acquisition) of gas monitoring image data is not used for a file name, the time of generation (time of acquisition) of gas monitoring image data may be stored in the storage unit 2 for displaying the time of generation (time of acquisition).

As described above, the gas monitoring image recording device D according to the present embodiment and the gas monitoring image recording method and the gas monitoring image recording program implemented therein involve extracting the features in response to extracting a leakage candidate area based on gas monitoring image data including a plurality of time-series images, and causing the storage unit 2 to store the features extracted in association with the gas monitoring image data from which the leakage candidate area has been extracted. Therefore, the gas monitoring image recording device D, the gas monitoring image recording method, and the gas monitoring image recording program can use the features as clues and thus can facilitate search for target image data.

According to the above, it is possible to provide the gas monitoring image recording device D, the gas monitoring image recording method, and the gas monitoring image recording program for extracting a leakage position as one of the features. Because these gas monitoring image recording device D, gas monitoring image recording method, and gas monitoring image recording program can search for target image data using the leakage position as a clue, it is possible to grasp the tendency of leakage for each position or each area in a monitoring target area for monitoring a gas leak. It is also possible to determine where monitoring should be strengthened and/or make a repair and replacement schedule for gas installations according to the tendency of leakage.

According to the above, it is possible to provide the gas monitoring image recording device D, the gas monitoring image recording method, and the gas monitoring image recording program for extracting a gas type as one of the features. Because these gas monitoring image recording device D, gas monitoring image recording method, and gas monitoring image recording program can search for target image data using the gas type as a clue, it is possible to grasp the tendency of leakage for each gas type. It is also possible to determine where monitoring should be strengthened and/or make a repair and replacement schedule for gas installations according to the tendency of leakage.

According to the above, it is possible to provide the gas monitoring image recording device D, the gas monitoring image recording method, and the gas monitoring image recording program for extracting a leakage scale as one of the features. Because these gas monitoring image recording device D, gas monitoring image recording method, and gas monitoring image recording program can search for target image data using the leakage scale as a clue, it is possible to grasp the tendency of leakage for each leakage scale. It is also possible to determine where monitoring should be strengthened and/or make a repair and replacement schedule for gas installations according to the tendency of leakage.

The gas monitoring image recording device D, the gas monitoring image recording method, and the gas monitoring image recording program can search for target image data with a search key.

According to the above, it is possible to provide the gas monitoring image recording device D, the gas monitoring image recording method, and the gas monitoring image recording program that can search for target image data using a search position or a search area as the search key. These gas monitoring image recording device D, gas monitoring image recording method, and gas monitoring image recording program make it possible to grasp the tendency of leakage for each position or each area in a monitoring target area for monitoring a gas leak, and to determine where monitoring should be strengthened and/or make a repair and replacement schedule for gas installations according to the tendency of leakage.

Because the gas monitoring image recording device D, the gas monitoring image recording method, and the gas monitoring image recording program display a monitoring target area image on the display unit 5, a search position or a search area can be designated as a search key with reference to the monitoring target area image.

The gas monitoring image recording device D, the gas monitoring image recording method, and the gas monitoring image recording program can display gas monitoring image data and a leakage position on the display unit 5, which makes it possible to visually recognize the gas installation that has caused the gas leak.

According to the above, it is possible to provide the gas monitoring image recording device D, the gas monitoring image recording method, and the gas monitoring image recording program that can search for target image data using a search gas type as the search key. These gas monitoring image recording device D, gas monitoring image recording method, and gas monitoring image recording program make it possible to grasp the tendency of leakage for each gas type, and to determine where monitoring should be strengthened and/or make a repair and replacement schedule for gas installations according to the tendency of leakage.

According to the above, it is possible to provide the gas monitoring image recording device D, the gas monitoring image recording method, and the gas monitoring image recording program that can search for target image data using a search leakage scale as the search key. These gas monitoring image recording device D, gas monitoring image recording method, and gas monitoring image recording program make it possible to grasp the tendency of leakage for each leakage scale, and to determine where monitoring should be strengthened and/or make a repair and replacement schedule for gas installations according to the tendency of leakage.

The present specification has disclosed the techniques of various aspects as described above. Below is a summary of the main techniques.

A gas monitoring image recording device according to an aspect includes: a storage unit that stores predetermined data; an image acquisition unit that acquires gas monitoring image data including a plurality of time-series images for use in monitoring a gas leak; a leakage candidate area extraction unit that extracts a leakage candidate area as a candidate for a gas leak based on the gas monitoring image data acquired by the image acquisition unit; a feature extraction unit that extracts predetermined features related to the gas leak in response to the leakage candidate area extraction unit extracting the leakage candidate area; and a storage processing unit that causes the storage unit to store the features extracted by the feature extraction unit in association with the gas monitoring image data from which the leakage candidate area has been extracted by the leakage candidate area extraction unit. Preferably, in the above-described gas monitoring image recording device, the image acquisition unit is an infrared camera that generates the gas monitoring image data. Preferably, in the above-described gas monitoring image recording device, the image acquisition unit is a communication unit that performs communication, and receives and acquires the gas monitoring image data from an infrared camera that generates the gas monitoring image data. Preferably, in the above-described gas monitoring image recording device, the image acquisition unit is a communication unit that performs communication, and receives and acquires the gas monitoring image data from a server device that stores and provides the gas monitoring image data. Preferably, in the above-described gas monitoring image recording device, the image acquisition unit is an interface unit that exchanges data with an external instrument, and reads and acquires the gas monitoring image data from a storage device that stores the gas monitoring image data. Preferably, in the above-described gas monitoring image recording device, the image acquisition unit is a drive device that reads data from a recording medium, and reads and acquires the gas monitoring image data from the recording medium that stores the gas monitoring image data. Preferably, in the above-described gas monitoring image recording device, the storage processing unit causes the storage unit to store an electronic file containing a feature extracted by the feature extraction unit in association with the gas monitoring image data from which the leakage candidate area has been extracted by the leakage candidate area extraction unit. Preferably, in the above-described gas monitoring image recording device, the gas monitoring image data from which the leakage candidate area has been extracted by the leakage candidate area extraction unit are image data of a predetermined time length including the image from which the leakage candidate area has been extracted by the leakage candidate area extraction unit, and the storage processing unit stores a feature extracted by the feature extraction unit in the file name of the electronic file of the image data. Preferably, in the above-described gas monitoring image recording device, the gas monitoring image data from which the leakage candidate area has been extracted by the leakage candidate area extraction unit are image data of a predetermined time length including the image from which the leakage candidate area has been extracted by the leakage candidate area extraction unit, and the storage processing unit stores a feature extracted by the feature extraction unit in the electronic file of the image data. Preferably, the electronic file of the image data is an mp4 electronic file.

This gas monitoring image recording device extracts the features in response to extracting a leakage candidate area based on gas monitoring image data including a plurality of time-series images, and causes the storage unit to store the features extracted in association with the gas monitoring image data from which the leakage candidate area has been extracted. Therefore, the gas monitoring image recording device can use the features as clues and thus can facilitate search for target image data.

In another aspect, in the above-described gas monitoring image recording device, the feature extraction unit extracts a leakage position as one of the features based on the leakage candidate area.

This makes it possible to provide the gas monitoring image recording device for extracting a leakage position as one of the features. Because this gas monitoring image recording device can search for target image data using the leakage position as a clue, it is possible to grasp the tendency of leakage for each position or each area in a monitoring target area for monitoring a gas leak. It is also possible to determine where monitoring should be strengthened and/or make a repair and replacement schedule for gas installations according to the tendency of leakage.

In another aspect, the gas monitoring image recording device described above further includes a gas information storage unit that stores position shape information and gas type information, the position shape information representing an arrangement position and a shape of a gas installation arranged in a monitoring target area for monitoring a gas leak, the gas type information representing a gas type of gas in the gas installation. The feature extraction unit extracts a leakage position based on the leakage candidate area, extracts a gas installation corresponding to the leakage position extracted based on the leakage position extracted and the position shape information stored in the gas information storage unit, and extracts, as another one of the features based on the facility extracted and the gas type information stored in the gas information storage unit, a gas type corresponding to the gas installation extracted.

This makes it possible to provide the gas monitoring image recording device for extracting a gas type as one of the features. Because this gas monitoring image recording device can search for target image data using the gas type as a clue, it is possible to grasp the tendency of leakage for each gas type. It is also possible to determine where monitoring should be strengthened and/or make a repair and replacement schedule for gas installations according to the tendency of leakage.

In another aspect, in the gas monitoring image recording device described above, the feature extraction unit extracts, as another one of the features based on the leakage candidate area, a leakage scale including at least one of a gas cloud size, a concentration-thickness product, and a time of appearance of leaking gas.

This makes it possible to provide the gas monitoring image recording device for extracting a leakage scale as one of the features. Because this gas monitoring image recording device can search for target image data using the leakage scale as a clue, it is possible to grasp the tendency of leakage for each leakage scale. It is also possible to determine where monitoring should be strengthened and/or make a repair and replacement schedule for gas installations according to the tendency of leakage.

In another aspect, the gas monitoring image recording device described above further includes: a display unit that displays an image; a search key input unit that receives a predetermined feature as a search key; and a search processing unit that searches for a feature corresponding to the search key received by the search key input unit from among a plurality of features stored in the storage unit in association with gas monitoring image data from which a leakage candidate area has been extracted by the leakage candidate area extraction unit, retrieves gas monitoring image data associated with the feature found, from which a leakage candidate area has been extracted by the leakage candidate area extraction unit, and displays the gas monitoring image data on the display unit.

This gas monitoring image recording device can search for target image data with a search key.

In another aspect, in the gas monitoring image recording device described above, the search key input unit receives a search position or a search area as the search key, the search position or the search area being a leakage position to be searched for.

This makes it possible to provide the gas monitoring image recording device that can search for target image data using a search position or a search area as the search key. This gas monitoring image recording device makes it possible to grasp the tendency of leakage for each position or each area in a monitoring target area for monitoring a gas leak, and to determine where monitoring should be strengthened and/or make a repair and replacement schedule for gas installations according to the tendency of leakage.

In another aspect, in the above-described gas monitoring image recording device, the display unit displays a monitoring target area image of a monitoring target area for monitoring a gas leak, and the search key input unit receives designation of the search position or the search area as the search key in the monitoring target area image displayed on the display unit.

This gas monitoring image recording device makes it possible to designate a search position or a search area as a search key with reference to the monitoring target area image displayed on the display unit.

In another aspect, in the gas monitoring image recording device described above, the search processing unit superimposes, on the gas monitoring image data retrieved, a leakage position as the feature found, and displays the gas monitoring image data retrieved on the display unit.

This gas monitoring image recording device can display gas monitoring image data and a leakage position on the display unit, which makes it possible to visually recognize the gas installation that has caused the gas leak.

In another aspect, in the gas monitoring image recording device described above, the search key input unit receives a search gas type as the search key, the search gas type being a gas type to be searched for.

This makes it possible to provide the gas monitoring image recording device that can search for target image data using a search gas type as the search key. This gas monitoring image recording device makes it possible to grasp the tendency of leakage for each gas type, and to determine where monitoring should be strengthened and/or make a repair and replacement schedule for gas installations according to the tendency of leakage.

In another aspect, in the gas monitoring image recording device described above, the search key input unit receives a search leakage scale as the search key, the search leakage scale being a leakage scale to be searched for.

This makes it possible to provide the gas monitoring image recording device that can search for target image data using a search leakage scale as the search key. This gas monitoring image recording device makes it possible to grasp the tendency of leakage for each leakage scale, and to determine where monitoring should be strengthened and/or make a repair and replacement schedule for gas installations according to the tendency of leakage.

A gas monitoring image recording method according to another aspect of the present invention includes: an image acquisition step of acquiring gas monitoring image data including a plurality of time-series images for use in monitoring a gas leak; a leakage candidate area extraction step of extracting a leakage candidate area as a candidate for a gas leak based on the gas monitoring image data acquired in the image acquisition step; a feature extraction step of extracting predetermined features related to the gas leak in response to extracting the leakage candidate area in the leakage candidate area extraction step; and a storage processing step of causing a storage unit to store the features extracted in the feature extraction step in association with the gas monitoring image data from which the leakage candidate area has been extracted in the leakage candidate area extraction step. A gas monitoring image recording program according to another aspect of the present invention is a program for causing a computer to execute: an image acquisition step of acquiring gas monitoring image data including a plurality of time-series images for use in monitoring a gas leak; a leakage candidate area extraction step of extracting a leakage candidate area as a candidate for a gas leak based on the gas monitoring image data acquired in the image acquisition step: a feature extraction step of extracting predetermined features related to the gas leak in response to extracting the leakage candidate area in the leakage candidate area extraction step; and a storage processing step of causing a storage unit to store the features extracted in the feature extraction step in association with the gas monitoring image data from which the leakage candidate area has been extracted in the leakage candidate area extraction step.

These gas monitoring image recording method and gas monitoring image recording program extract the features in response to extracting a leakage candidate area based on gas monitoring image data including a plurality of time-series images, and cause the storage unit to store the features extracted in association with the gas monitoring image data from which the leakage candidate area has been extracted. Therefore, the gas monitoring image recording method and the gas monitoring image recording program can use the features as clues and thus can facilitate search for target image data.

This application is based on Japanese Patent Application No. 2018-128367 filed on Jul. 5, 2018, the content of which is included in the present application.

Although an embodiment of the present invention has been illustrated and described in detail, it is to be understood that these are merely example drawings and example cases, and the present invention is not limited to them. The scope of the present invention should be construed according to the terms in the appended claims.

In order to express the present invention, the present invention has been described appropriately and fully so far through an embodiment with reference to the drawings. Those skilled in the art should understand that modifications and/or improvements can be easily made to the above embodiment. Therefore, as long as modified forms or improved forms made by those skilled in the art do not depart from the scope of the claims, the modified forms or improved forms are construed as being included in the scope of the claims.

INDUSTRIAL APPLICABILITY

The present invention can provide a gas monitoring image recording device, a gas monitoring image recording method, and a gas monitoring image recording program for recording a gas monitoring image for use in monitoring a gas leak.

The invention claimed is:

1. A gas monitoring image recording device comprising:
a storage that stores predetermined data;
an image acquisitor that acquires gas monitoring image data including a plurality of time-series images for use in monitoring a gas leak;
a leakage candidate area extractor that extracts a leakage candidate area as a candidate for a gas leak based on the gas monitoring image data acquired by the image acquisitor;
a feature extractor that extracts predetermined features related to the gas leak in response to the leakage candidate area extractor extracting the leakage candidate area; and
a storage processor that causes the storage to store a first electronic file and a second electronic file in association with the first electronic file, the first electronic file containing the features extracted by the feature extractor, the second electronic file containing the gas monitoring image data from which the leakage candidate area has been extracted by the leakage candidate area extractor.

2. The gas monitoring image recording device according to claim 1, wherein
based on the leakage candidate area, the feature extractor extracts a leakage position as one of the features.

3. The gas monitoring image recording device according to claim 1, further comprising
a gas information storage that stores position shape information and gas type information, the position shape information representing an arrangement position and a shape of a gas installation arranged in a monitoring target area for monitoring a gas leak, the gas type information representing a gas type of gas in the gas installation, wherein
the feature extractor extracts a leakage position based on the leakage candidate area, extracts a gas installation corresponding to the leakage position extracted based on the leakage position extracted and the position shape information stored in the gas information storage, and extracts, as another one of the features based on the gas installation extracted and the gas type information stored in the gas information storage, a gas type corresponding to the gas installation extracted.

4. The gas monitoring image recording device according to claim 1, wherein
based on the leakage candidate area, the feature extractor extracts, as another one of the features, a leakage scale including at least one of a gas cloud size, a concentration-thickness product, and a time of appearance of leaking gas.

5. The gas monitoring image recording device according to claim 1, further comprising:
a display that displays an image;
a search key inputter that receives a predetermined feature as a search key; and
a search storage processor that searches for a feature corresponding to the search key received by the search key inputter from among a plurality of features stored in the storage in association with gas monitoring image data from which a leakage candidate area has been extracted by the leakage candidate area extractor, retrieves gas monitoring image data associated with the feature found, from which a leakage candidate area has been extracted by the leakage candidate area extractor, and displays the gas monitoring image data on the display.

6. The gas monitoring image recording device according to claim 5, wherein
the search key inputter receives a search position or a search area as the search key, the search position or the search area being a leakage position to be searched for.

7. The gas monitoring image recording device according to claim 6, wherein
the display displays a monitoring target area image of a monitoring target area for monitoring a gas leak, and
the search key inputter receives designation of the search position or the search area as the search key in the monitoring target area image displayed on the display.

8. The gas monitoring image recording device according to claim 6, wherein
the search storage processor superimposes, on the gas monitoring image data retrieved, a leakage position as the feature found, and displays the gas monitoring image data retrieved on the display.

9. The gas monitoring image recording device according to claim 5, wherein
the search key inputter receives a search gas type as the search key, the search gas type being a gas type to be searched for.

10. The gas monitoring image recording device according to claim 5, wherein
the search key inputter receives a search leakage scale as the search key, the search leakage scale being a leakage scale to be searched for.

11. A gas monitoring image recording method comprising:
acquiring gas monitoring image data including a plurality of time-series images for use in monitoring a gas leak;
extracting a leakage candidate area as a candidate for a gas leak based on the gas monitoring image data acquired in the acquiring;
extracting predetermined features related to the gas leak in response to extracting the leakage candidate area in the extracting; and
causing a storage to store a first electronic file and a second electronic file in association with the first electronic file, the first electronic file containing the features extracted in the extracting, the second electronic file containing the gas monitoring image data from which the leakage candidate area has been extracted in the extracting.

12. A non-transitory recording medium storing a computer readable gas monitoring image recording program for causing a computer to execute:
acquiring gas monitoring image data including a plurality of time-series images for use in monitoring a gas leak;
extracting a leakage candidate area as a candidate for a gas leak based on the gas monitoring image data acquired in the acquiring;
extracting predetermined features related to the gas leak in response to extracting the leakage candidate area in the extracting; and
causing a storage to store a first electronic file and a second electronic file in association with the first electronic file, the first electronic file containing the features extracted in the extracting, the second electronic file containing the gas monitoring image data from which the leakage candidate area has been extracted in the extracting.

13. The gas monitoring image recording device according to claim 2, further comprising
a gas information storage that stores position shape information and gas type information, the position shape information representing an arrangement position and a shape of a gas installation arranged in a monitoring target area for monitoring a gas leak, the gas type information representing a gas type of gas in the gas installation, wherein
the feature extractor extracts a leakage position based on the leakage candidate area, extracts a gas installation corresponding to the leakage position extracted based on the leakage position extracted and the position shape information stored in the gas information storage, and extracts, as another one of the features based on the gas installation extracted and the gas type information stored in the gas information storage, a gas type corresponding to the gas installation extracted.

14. The gas monitoring image recording device according to claim 2, wherein
based on the leakage candidate area, the feature extractor extracts, as another one of the features, a leakage scale including at least one of a gas cloud size, a concentration-thickness product, and a time of appearance of leaking gas.

15. The gas monitoring image recording device according to claim 2, further comprising:
a display that displays an image;
a search key inputter that receives a predetermined feature as a search key; and
a search storage processor that searches for a feature corresponding to the search key received by the search key inputter from among a plurality of features stored in the storage in association with gas monitoring image data from which a leakage candidate area has been extracted by the leakage candidate area extractor, retrieves gas monitoring image data associated with the feature found, from which a leakage candidate area has been extracted by the leakage candidate area extractor, and displays the gas monitoring image data on the display.

16. The gas monitoring image recording device according to claim 3, wherein
based on the leakage candidate area, the feature extractor extracts, as another one of the features, a leakage scale including at least one of a gas cloud size, a concentration-thickness product, and a time of appearance of leaking gas.

17. The gas monitoring image recording device according to claim 3, further comprising:
a display that displays an image;
a search key inputter that receives a predetermined feature as a search key; and
a search storage processor that searches for a feature corresponding to the search key received by the search key inputter from among a plurality of features stored in the storage in association with gas monitoring image data from which a leakage candidate area has been extracted by the leakage candidate area extractor, retrieves gas monitoring image data associated with the feature found, from which a leakage candidate area has been extracted by the leakage candidate area extractor, and displays the gas monitoring image data on the display.

18. The gas monitoring image recording device according to claim 4, further comprising:
a display that displays an image;
a search key inputter that receives a predetermined feature as a search key; and
a search storage processor that searches for a feature corresponding to the search key received by the search key inputter from among a plurality of features stored in the storage in association with gas monitoring image data from which a leakage candidate area has been extracted by the leakage candidate area extractor, retrieves gas monitoring image data associated with the feature found, from which a leakage candidate area has been extracted by the leakage candidate area extractor, and displays the gas monitoring image data on the display.

19. The gas monitoring image recording device according to claim 6, wherein
the search key inputter receives a search gas type as the search key, the search gas type being a gas type to be searched for.

20. The gas monitoring image recording device according to claim 6, wherein
the search key inputter receives a search leakage scale as the search key, the search leakage scale being a leakage scale to be searched for.

21. The gas monitoring image recording device according to claim 1, wherein
the first electronic file has a first electronic file name with a first file name extension,
the second electronic file has a second electronic file name with a second file name extension, and
the storage processor assigns the first and second electronic file names such that the second electronic file name is identical to the first electronic fine name while the second file name extension is different from the first file name extension.

22. A gas monitoring image recording device comprising:
a storage that stores predetermined data;
an image acquisitor that acquires gas monitoring image data including a plurality of time-series images for use in monitoring a gas leak;
a leakage candidate area extractor that extracts a leakage candidate area as a candidate for a gas leak based on the gas monitoring image data acquired by the image acquisitor;
a feature extractor that extracts predetermined features related to the gas leak in response to the leakage candidate area extractor extracting the leakage candidate area; and
a storage processor that causes the storage to store the features extracted by the feature extractor in association with the gas monitoring image data from which the leakage candidate area has been extracted by the leakage candidate area extractor, wherein
the gas monitoring gas image data from which the leakage candidate area has been extracted by the leakage candidate area extractor is contained in an electronic file having an electronic file name, and
the features extracted by the feature extractor are incorporated in the electronic file name.

23. The gas monitoring image recording device according to claim 22, wherein
the storage processor is configured to:
generate a code based on the features extracted by the feature extractor by compressing the features extracted by the feature extractor, the code having an amount of data smaller than an amount of the features extracted by the feature extractor,
incorporate the code to the electronic file name, and
store correspondence information indicating a correspondence between the code and the features extracted by the feature extractor in the storage.

* * * * *